(12) United States Patent
Karam

(10) Patent No.: US 8,839,120 B2
(45) Date of Patent: *Sep. 16, 2014

(54) INITIATING COMMUNICATIONS WITH WEB PAGE VISITORS AND KNOWN CONTACTS

(75) Inventor: Joseph F. Karam, Mountain View, CA (US)

(73) Assignee: Google Inc., Mountain View, CA (US)

( * ) Notice: Subject to any disclaimer, the term of this patent is extended or adjusted under 35 U.S.C. 154(b) by 794 days.

This patent is subject to a terminal disclaimer.

(21) Appl. No.: 13/045,615

(22) Filed: Mar. 11, 2011

(65) Prior Publication Data

US 2011/0161835 A1 Jun. 30, 2011

Related U.S. Application Data

(63) Continuation of application No. 11/849,805, filed on Sep. 4, 2007, now Pat. No. 7,945,861.

(51) Int. Cl.
*G06F 3/00* (2006.01)
*G06F 3/048* (2013.01)

(52) U.S. Cl.
USPC .......................... 715/751; 715/745; 715/811

(58) Field of Classification Search
USPC .................... 715/738, 745, 751, 752, 811
See application file for complete search history.

(56) References Cited

U.S. PATENT DOCUMENTS

| | | |
|---|---|---|
| 6,266,649 B1 | 7/2001 | Linden et al. |
| 6,366,962 B1 | 4/2002 | Teibel |
| 6,434,599 B1 | 8/2002 | Porter |
| 6,577,714 B1 | 6/2003 | Darcie et al. |
| 6,677,968 B1 | 1/2004 | Appelman |
| 6,745,178 B1 | 6/2004 | Emens et al. |
| 6,981,021 B2 | 12/2005 | Takakura et al. |
| 7,069,308 B2 | 6/2006 | Abrams |
| 7,082,365 B2 | 7/2006 | Sheha et al. |
| 7,117,254 B2 | 10/2006 | Lunt et al. |

(Continued)

FOREIGN PATENT DOCUMENTS

| | | |
|---|---|---|
| WO | 9749192 | 12/1997 |
| WO | 0201405 | 1/2002 |

(Continued)

OTHER PUBLICATIONS

"Talk and IM with your friends for free", Google Talk, www.google.cornitalk, Dec. 22, 2005, 1 pg.

(Continued)

*Primary Examiner* — Weilun Lo
*Assistant Examiner* — Truc Chuong
(74) *Attorney, Agent, or Firm* — McDermott Will & Emery LLP

(57) ABSTRACT

Methods and apparatus, including computer program products, implementing and using techniques for initiating communication between two users among several users while at least one of the two users is browsing a web page. User information is collected about each user among the several users. Page information is collected about what web page each user among the several users is browsing. A portion of the user information and page information for a first user and a second user is shared between the first user and the second user when a predetermined criterion is met, and request by the first user to initiate communication with the second user is processed.

18 Claims, 8 Drawing Sheets

(56) References Cited

U.S. PATENT DOCUMENTS

| | | | |
|---|---|---|---|
| 7,188,153 B2 | 3/2007 | Lunt et al. | |
| 7,200,638 B2 | 4/2007 | Lake | |
| 7,222,187 B2 | 5/2007 | Yeager et al. | |
| 7,234,117 B2 | 6/2007 | Zaner et al. | |
| 7,310,676 B2 | 12/2007 | Bourne | |
| 7,342,587 B2 | 3/2008 | Danzig et al. | |
| 7,373,244 B2 | 5/2008 | Kreft | |
| 7,468,729 B1 | 12/2008 | Levinson | |
| 7,472,352 B2 | 12/2008 | Liversidge et al. | |
| 7,568,007 B2 | 7/2009 | Narayanaswami et al. | |
| 7,603,413 B1 | 10/2009 | Herold et al. | |
| 7,698,165 B1* | 4/2010 | Tawakol et al. | 705/14.4 |
| 7,797,642 B1 | 9/2010 | Karam et al. | |
| 7,831,917 B1 | 11/2010 | Karam | |
| 7,917,866 B1 | 3/2011 | Karam | |
| 8,171,424 B1 | 5/2012 | Karam | |
| 2001/0029506 A1* | 10/2001 | Lee et al. | 707/102 |
| 2002/0013738 A1 | 1/2002 | Vistisen | |
| 2002/0116458 A1 | 8/2002 | Bricklin et al. | |
| 2002/0130904 A1 | 9/2002 | Becker et al. | |
| 2003/0037110 A1 | 2/2003 | Yamamoto | |
| 2003/0079024 A1 | 4/2003 | Hough et al. | |
| 2003/0135493 A1 | 7/2003 | Phelan et al. | |
| 2003/0154250 A1 | 8/2003 | Miyashita | |
| 2003/0210265 A1 | 11/2003 | Haimberg | |
| 2004/0041836 A1 | 3/2004 | Zaner et al. | |
| 2004/0148351 A1 | 7/2004 | Cotte | |
| 2004/0152477 A1 | 8/2004 | Wu et al. | |
| 2004/0172455 A1 | 9/2004 | Green et al. | |
| 2004/0179039 A1 | 9/2004 | Blattner et al. | |
| 2004/0189701 A1 | 9/2004 | Badt, Jr. | |
| 2004/0203746 A1 | 10/2004 | Knauerhase et al. | |
| 2005/0172001 A1 | 8/2005 | Zaner et al. | |
| 2005/0174975 A1 | 8/2005 | Mgrdechian et al. | |
| 2005/0177385 A1 | 8/2005 | Hull et al. | |
| 2005/0193054 A1 | 9/2005 | Wilson et al. | |
| 2005/0197846 A1 | 9/2005 | Pezaris et al. | |
| 2005/0198031 A1 | 9/2005 | Pezaris et al. | |
| 2005/0210102 A1 | 9/2005 | Johnson et al. | |
| 2005/0210409 A1 | 9/2005 | Jou | |
| 2005/0228853 A1 | 10/2005 | Yamamura et al. | |
| 2005/0250552 A1 | 11/2005 | Eagle et al. | |
| 2005/0256866 A1 | 11/2005 | Lu et al. | |
| 2006/0026233 A1 | 2/2006 | Tenembaum et al. | |
| 2006/0031772 A1 | 2/2006 | Valeski | |
| 2006/0085259 A1 | 4/2006 | Nicholas et al. | |
| 2006/0184886 A1 | 8/2006 | Chung et al. | |
| 2006/0190536 A1 | 8/2006 | Strong et al. | |
| 2006/0235873 A1 | 10/2006 | Thomas | |
| 2006/0241859 A1 | 10/2006 | Kimchi et al. | |
| 2006/0294134 A1 | 12/2006 | Berkhim et al. | |
| 2007/0067098 A1 | 3/2007 | Zelentsov | |
| 2007/0112735 A1 | 5/2007 | Holloway et al. | |
| 2007/0118809 A1 | 5/2007 | Ozugur et al. | |
| 2007/0162862 A1 | 7/2007 | Ogasawara et al. | |
| 2007/0300161 A1* | 12/2007 | Bhatia et al. | 715/745 |
| 2008/0010319 A1 | 1/2008 | Vonarburg et al. | |
| 2008/0059584 A1* | 3/2008 | Lam et al. | 715/206 |
| 2008/0222295 A1 | 9/2008 | Robinson et al. | |

FOREIGN PATENT DOCUMENTS

| | | |
|---|---|---|
| WO | 2005006145 | 1/2005 |
| WO | 2005074443 | 8/2005 |
| WO | 2005077068 | 8/2005 |

OTHER PUBLICATIONS

Apple.com, iChat AV Videoconferencing for the rest of us, www.apple.comimacosx/featureslichat, printed Dec. 22, 2005, 2 pgs.

Campbell, Susan, et al., "Blogscape: Cartography on Social Networks", http://warm.umd.edu/-susanc/blogscape, 9 pages, Dec. 12, 2005, 9 pgs.

Saint-Andre, Ed. P., "Extensible Messaging and Presence Protocol (XMPP): Instant Messaging and Presence", Oct. 2004, 90 pgs.

Schoder, Detlef Prof. Dr., "Targetting Mobile Consumers (I): context-independent mobile B2C-Applications", Lecture Unit 5, WHU, EEB FS 2003, 20 pgs.

"Application for today's mobile lifestyle", Community Messaging Center (CMS) 5.0, HP OpenCall-Yomi, Hewlett-Packard Development Company, 5982-2057EE, Oct. 2003, 2 pgs.

Burak, Assaf, et al., "Analyzing Usage of Location Based Services", CHI 2003, Apr. 5-10,2003, Ft. Lauderdale, FL. ACM 1-58113-630- Jul. 3, 2004, Apr. 5, 2003, 2 pgs.

Burak, Assaf, et al., "Usage Patterns of FriendZone-Mobile Location-Based Community Services", http://www.this.net/-~frank/pstill.html, 2004, 8 pgs.

Vogiazou, Yanna et al., "Presence Based Play: Towards a Design for Large Group Social Interaction", Proceedings of the First International Conference on Appliance Design) (IAD), Bristol, UK, May 6-8, 2003, 8 pgs.

Piescik, John, "Click to Call: Creating Sales and Customer Satisfaction", ArriveNet Business Editorials, http://editorials.arrivenet.comibusiness/pring.php?url-http://64.233.16, Sep. 7, 2005, 3 pgs.

http://www.chatsum.com/, retrieved Nov. 16, 2007, 2 pgs.

http://www.chatsum.com/about, retrieved Nov. 16, 2007, 4 pgs.

"Entering the UMTS era-mobile applications for pocket devices and services", Part Two, European Information technology Observatory, EITO 2002, pp. 203-219.

"Mates, when social networks marry presence", http://gigaom.comi2005/05/04/mates-when-social-networks-marry-presence/, OM Malik's Broadband Blog posted May 4, 2005, 3 pgs.

"Mobile Marketing and Wireless Internet Advertising", Position Paper, InterACT Research Communications Company, Nov. 1999, 40 pgs.

"WaveMarket's Crunkie Puts Mobile Social Networks on the Map", http://www.prnewswire.com/cgi-bin/stores.pl?ACCT=104&STORY=/www/story/11-15-...., retrieved Nov. 15, 2004, 2 pgs.

Amazon.com Yellow page (Sample page). http://www.amazon.com/gp/yp/B0004KKOPC/I 03-4107609-18318. . ., retrieved Dec. 23, 2005, 3 pgs.

Balkin, Adam, "New Cell Phone Service Can Help Manage Your Social Life", Apr. 6, 2005, published Sep. 26, 2005 by NY1 News, 1 pg.

Barnett, A., Wayback Machine (Archive. Org) Alex Barnet Blog Website, Oct. 26, 2005, retrieved Apr. 2, 2009, pp. 1-5.

Bleecker, Julian, Prog., "Location-based mobile media: maps, games & stories", Part Two, European Information Technology Observatory, EITO 2002, 5 pgs.

CNET Review of Google Maps, published Nov. 7, 2005, http://reviews.cnet.com/online-software-services/googlemaps/4505-9239_7-31591128.html, retrieved Dec. 26, 2007, 3 pgs.

Dodgeball.com-Mobile Social Software, About Us: Bios, http://www.dodgeball.com/aboutus_bios.php?DBSESS=5fc094c6e87d7261f2c79004722..., Sep. 2005, 1 pg.

Dodgeball.com-Mobile Social Software, Meet Friends of Friends, http://www.dodgeball.com, Sep. 2005, 1 pg.

http://digg.com/software/New_page_specific_chat_extension_launched_for_Firefox_(Safari_and_IE_soon), retrieved Nov. 16,2007, 3 pgs.

GeoCommunity Staff, "Affiliate and Reseller Programs for GIS, Geo-Spatial and Location-Based Content Websites", GeoCommunity.com, http://spatialnews.geocomm.com/features/georesellers/, 2005, 5 pgs.

Johnson, Steven, "Friends 2005: Hooking Up", http://www.dodgeball.com/images/discover_1_big.jpg, Discover, vol. 26, No. 9, Sep. 2005, pp. 22-23.

Laycock, Jennifer, "Amazon's A9 Offers Unique Local Search Experience", http://www.searchengineguide.com/laycock/003701.html, Mar. 17, 2005, 4 pgs.

LocatioNet-demos, Mapping and Geo-Information Solution for Mass-Market Phones, DEMOS, http://web.archive.org/web/20050406175554/www.locationet.com/demos.htm, retrieved Sep. 18, 2008, 2 pgs.

(56) References Cited

OTHER PUBLICATIONS

LocatioNet, Mapping and Geo-Information Solution for Mass-Market Phones, PRODUCTS, http://web.archive.org/web/20050406190221/www.locationet.com/mymap.htm, retrieved Sep. 18, 2008, 2 pgs.

Risnes, Oddvar, "Developing Advanced Parlay-Enabled Value Added Services", Telenor Forskningsnotat/Scientific Document R&D N 76/2003, Jan. 7, 2004, 18 pgs.

Smith, Brad, "Spreading the word with Moblogs", Wireless Week, http://www.wirelessweek.com/article/CA608001.html?text=spreading+the+word+with+. . ., Jun. 15, 2005, 2 pgs.

WaveBlog-WaveMarket, Inc., DEMO, The Premier Launchpad for Emerging Technologies, http://www.demo.com/demonstrators/demo2004/54868.html, 2004, 1 pg.

WaveMarket, Company Overview, Products, Streetive, http://www.wavemarket.com, 2004, 5 pgs.

\* cited by examiner

INITIATING COMMUNICATIONS WITH WEB PAGE VISITORS AND KNOWN CONTACTS

CROSS-REFERENCE TO RELATED APPLICATIONS

The present application is a continuation of U.S. patent application Ser. No. 11/849,805, filed on Sep. 4, 2007, entitled "Initiating Communications With Web Page Visitors And Known Contacts," which is incorporated herein by reference.

BACKGROUND

This invention relates to searching and browsing a computer network system. Computer users increasingly use web browsers to navigate document collections, for example, on the World Wide Web on the Internet, or on various types of intranets in order to find information, or simply as a serendipitous way of spending time.

Generally speaking, each document that is accessible on the World Wide Web or on an intranet has an address, or Uniform Resource Locator (URL), in the form "http://ww-w.server.net/directory/file.html". In this notation, the "http:" specifies the protocol by which the document is to be delivered, in this case the "HyperText Transport Protocol." The "www.server.net" specifies the name of a computer, server, or group of computers on which the document resides; "directory" refers to a directory or folder on the server in which the document resides; and "file.html" specifies the name of a file with contents that the user can ultimately view in her web browser.

Web browsing is typically a solitary activity, in many ways similar to reading a book or a newspaper. Often, there is a desire among users to discuss what they view or read on web pages with other users. There are currently several ways in which this can be accomplished. For example, many web pages provide so-called message boards. A message board is typically a designated portion of a web page, where users can post comments or discuss topics that are relevant to the contents of the web page. Message boards typically have different physical locations on different web pages and can thus sometimes be difficult for users to find. Some message boards allow the users to post comments anonymously, whereas other message boards require the users to register and obtain unique user IDs and passwords before allowing the user to post comments to the message board. Furthermore, message boards are not synchronous, that is, users typically cannot have a direct, real time dialog with each other by posting messages on message boards.

In order to achieve synchronous communication between users, special applications known as instant messaging (IM) applications can be used. IM enables real-time communication between two or more people, typically based on typed text. The text is conveyed between the user's computers through a network, such as the Internet. IM requires the use of a client program that uses an IM service. In most IM applications, a user creates a contact list, and can only communicate with the people who have been added to the contact list. Most IM services also offer a presence feature that indicates what people on the user's contact list are currently online and available to chat (that is, send and receive messages). Most instant messaging applications also include the ability to set a status message, roughly analogous to the message on a telephone answering machine.

SUMMARY

In general, in one aspect, methods and apparatus are provided, including computer program products, implementing and using techniques for initiating communication between two users among several users while at least one of the two users is browsing a web page. User information is collected about each user among the several users. Page information is collected about what web page each user among the several users is browsing. A portion of the user information and page information for a first user and a second user is shared between the first user and the second user when a predetermined criterion is met, and request by the first user to initiate communication with the second user is processed.

Various embodiments can include one or more of the following features. Collecting user information can include collecting one or more of: a user name, an Internet Protocol address, and an email address. Collecting page information can include collecting a name of a Uniform Resource Locator for the web page. Collecting user information and collecting page information can be done using a toolbar installed in a web browser in each user's computer. The users can correspond to all users using the toolbar in their respective web browsers.

The predetermined criterion can be that the first user and the second user are simultaneously browsing one of: a same web site, a same sub-site of a web site, or a same web page of a web site. The predetermined criterion can be that the first user and the second user have given permission to contact each other. Sharing a portion of the user information and the page information can include one or more of: providing an identifier of the first user in the second user's web browser and providing an identifier of the second user in the first user's web browser.

The identifier of the first user can be provided in a drop-down menu of a toolbar installed in the second user's web browser and the identifier of the second user can be provided in a drop-down menu of a toolbar installed in the first user's web browser. Sharing a portion of the user information and the page information can further include one or more of: providing a mechanism for the first user to send an instant message to the second user, and providing a mechanism for the second user to send an instant message to the first user.

Information about what web pages each user has bookmarked can be collected. An indication can be provided to the first user when the first user is actively browsing a web page bookmarked by the second user, and an indication can be provided to the second user when the second user is actively browsing a web page bookmarked by the first user Various embodiments can include one or more of the following advantages. The solitary aspect of web browsing can be reduced by allowing users to synchronously discuss a web site with other people. These other people can be friends of the user or unknown people who are simultaneously browsing the same web page as the user, or who have bookmarked the web page in the past. Users can invite other users to co-browse a web site together. Users can serendipitously meet new people with similar interests, as indicated by the fact that they are browsing the same web page or have bookmarked the web page in the past, and thereby expand their social network. Users can set status messages to let other users know whether they are available for online interactions or prefer to be left alone. There is no need to remember the location of individual message boards, nor to sign into individual message boards with a specific user ID and a password. Online conversations with other users, for example, while co-browsing a web page can be saved locally or remotely for future reference. Users can contact other users while remaining in their web browser (i.e., without having to switch to a separate application). Users can be contacted by other users even if they are not actively browsing a web page.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

As was described above, the various embodiments described herein provide methods and apparatus that enable a more interactive web browsing experience for users, by allowing the users to contact and interact with other users on a voluntary basis while browsing a web page, for example, to discuss the contents or any other aspects of the web page in real time. As will be described in further detail below, in various embodiments, this is enabled by users agreeing to collecting and sharing information about what web pages or web sites the users are currently browsing, or what web pages or web sites the users have bookmarked in the past. This information can be collected through several mechanisms. In one embodiment, which will be described below, the information is collected by a toolbar installed in a web browser. As will also be seen below, the toolbar can be used, for example, to display whether other users who have given permission to collecting and sharing information are currently looking at the same web page or web site, or whether other users have previously bookmarked the web page or web site. In various embodiments, these users' online identities can also be displayed, at the request of the users. In some embodiments, by selecting a user identity that is displayed in the toolbar, the selecting user can initiate communication with the selected user if the selected user is interested in such requests, for example, in the format of instant messages, and ask the selected user for advice, or start a discussion about the web page or web site that the selecting user is currently viewing, thus making the browsing experience much more interactive than conventional web browsing.

Figure 1:
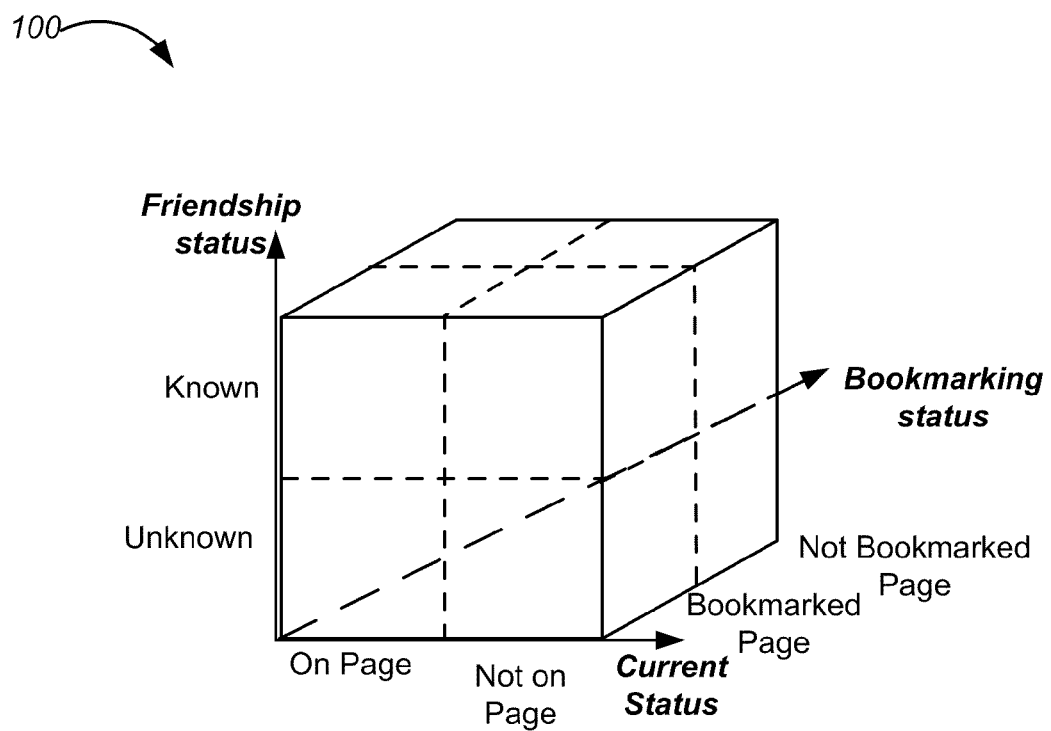
FIG. 1 shows a schematic visualization of tracked information in accordance with one embodiment.

In accordance with various embodiments of the invention, different categories of information can be tracked. FIG. 1 shows a schematic visualization of the tracked information in the form of a three-dimensional cube (100) that illustrates the tracked information along different dimensions in accordance with one embodiment of the invention. It should however be clear that this three-dimensional cube can be generalized to an N-dimensional space with any number of dimensions that can be useful in order to enhance the browsing experience of the user, as will be described below.

As can be seen in FIG. 1, a first dimension of the cube (100) tracks a friendship status, and has the possible values of the other user being known or unknown. In some embodiments, known other users are the users that exist in a person's contact list and with whom the user has had some kind of previous interaction, and unknown users are people that are not in the user's contact list. It should be noted that the known/unknown user values are merely examples of friendship status. In some implementations, there can be various other categories between a user being known or unknown, for example, based on a frequency of contact between the users. For example, users can be categorized as "well-known" or "semi-known" based on the number of user interactions that have taken place with the user.

A second dimension of the cube (100) tracks a current status of the users, and has the possible values of a user being on the page or not being on the page. In this context, being on the page means that the user is actively browsing the web page or that the web page is in focus (that is, the web page is being displayed, but the user is not actively interacting with the web page), and not being on the page means that the user is not actively browsing the web page or that the page is not in focus. However, it should be realized that in some embodiments, browsing the web page can mean browsing the same web site, or a same subsection of a particular web site. For example, when a web site contains several thousands of web pages, it is unlikely that two users will be browsing the exact same one page at the exact same time. In such a situation, it can be useful to expand the selection of users to users who are within the same subsection of the web site. Being on a page can also mean having the page open in a web browser, even if the user is not actively looking at the page, as a user may be switching back and forth between multiple web pages displayed in multiple browser windows or tabs on his or her computer.

A third dimension of the cube (100) tracks a bookmark status, and has the possible values of the user having bookmarked the page previously or not having bookmarked the page previously. In most case, a user only bookmarks a web page if the web page is of special interest to him. Thus, knowing whether a user has bookmarked a web page is a good indicator as to whether the user has some special knowledge and/or interest in that particular web page.

As can be seen in FIG. 1, tracking these three dimensions, where each dimension has two possible values, leads to eight possible sub-combinations, illustrated by the smaller cubes in FIG. 1. These possible sub-combinations are:

1. Unknown users who are on the page and who have bookmarked the page.
2. Unknown users who are not on the page and who have bookmarked the page.
3. Unknown users who are on the page and who have not bookmarked the page.
4. Unknown users who are not on the page and who have not bookmarked the page.
5. Known users who are on the page and who have bookmarked the page.
6. Known users who are not on the page and who have bookmarked the page.
7. Known users who are on the page and who have not bookmarked the page.
8. Known users who are not on the page and who have not bookmarked the page.

As the skilled person realizes, some of these combinations are less interesting than others from an interaction point of view. For example, as can be seen in sub-combination (4) above, an unknown user who is currently not on the web page and who has not bookmarked the page is probably not likely to be very interested in the web page or will not be able to provide very much information about the contents of the page. On the other hand, as can be seen in sub-combination (5) above, a friend who is currently on the page and who has also bookmarked the page, is probably much more likely to be interested in discussing the contents of the web page.

Expressed differently, in each of the three dimensions, there is one "desirable" value that can strengthen the case for initiating contact, and one value that may not strengthen the case for initiating contact. The desirable conditions are: known user, on the page, and bookmarked the page. The less desirable conditions are: unknown user, not on page, and not bookmarked page. Each desirable condition can be assigned a desirability score, such as one point, whereas undesirable conditions can be assigned zero points. Usually, a desirable condition is more likely to occur alone than in combination with other desirable conditions. Consequently, the eight sub-combinations above can be regrouped into three main cases, which each have a desirability score of at least one, that is, a desirable condition happens by itself or in combination with other desirable conditions, and which are likely to be useful for interaction purposes. These cases are:

(A) Known or unknown users who are currently on the same web page.
(B) Known or unknown users who have bookmarked the same web page in the past.
(C) Known users (i.e., friends), regardless of their current status or bookmarking status.

As was described above, in some embodiments, these categories of information are collected using a toolbar. Toolbars for web browsers are well known to those of ordinary skill in the art. One provider of a commonly used toolbar is Google Inc. of Mountain View, Calif. Generally toolbars provide additional functionality to what is supplied by regular web browsers. Often, the additional functionality is related to user-specific features, such as checking the user's personal email, storing personal bookmarks corresponding to web pages, filling in forms with personal information, and so on. In order to accomplish these functionalities, a user typically has to register and enter some type of personal or identifying information when downloading and installing the toolbar. In exchange for the additional functionality that is given by the toolbar, the toolbar also typically collects and sends limited information to the provider of the toolbar. Such information can include, for example, the IP address of the computer on which the toolbar is installed, and what web page or web site a user is accessing, as described above. As will be described in further detail below, collecting this information with the user's consent makes it possible for a toolbar provider to know, at any given instant, what web pages or web sites all their toolbar users are browsing. This information can further be compared to that of other toolbar users and be used to connect users that may be interested in interacting with each other, for example, in accordance with the use cases (A)-(C), described above.

Figure 2:
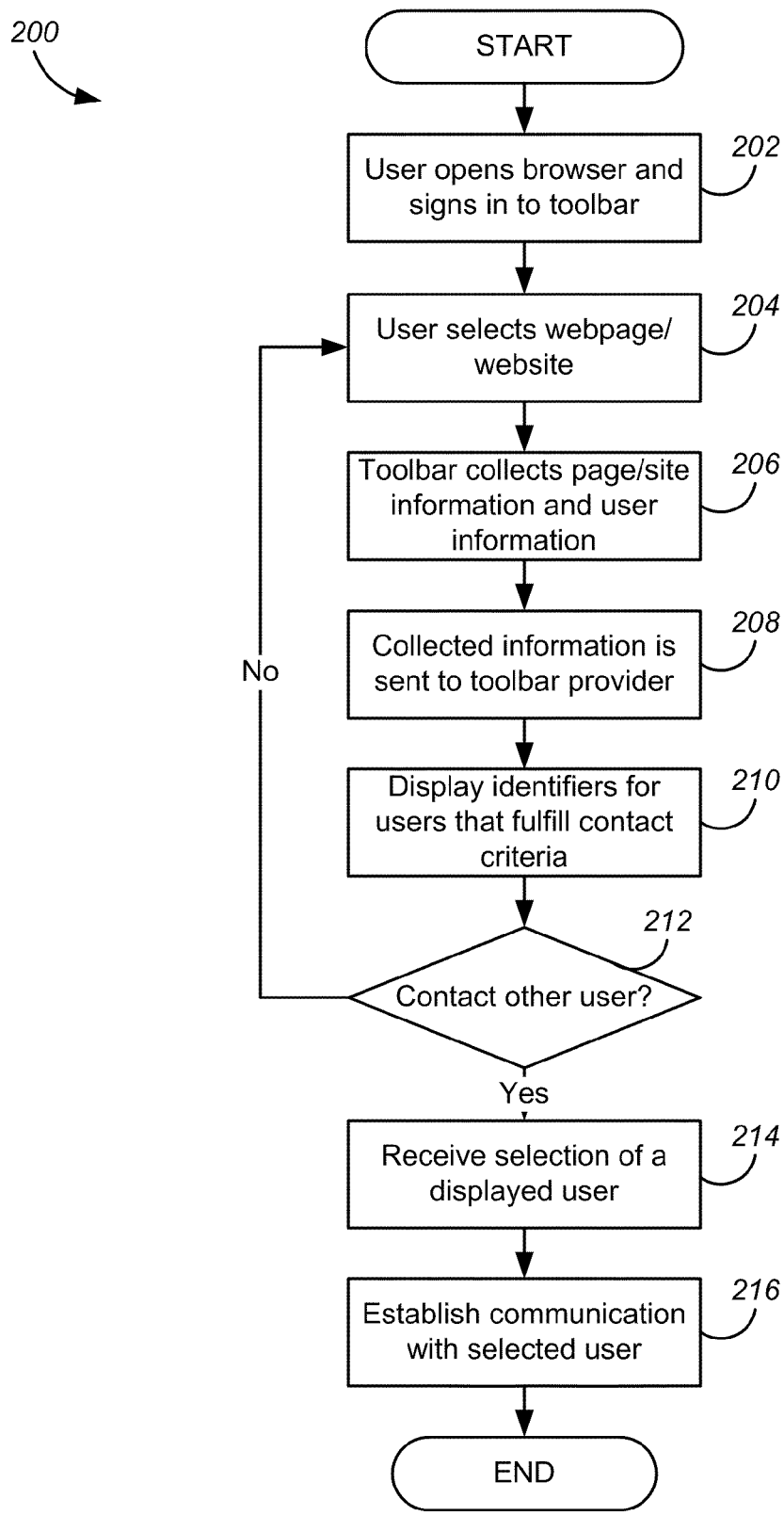
FIG. 2 shows a process for connecting users browsing web pages in accordance with one embodiment.

An exemplary process (200) for connecting users in accordance with one embodiment will now be described with reference to FIG. 2. As can be seen in FIG. 2, the process (200) starts with a user opening a web browser on his or her computer and signing into the toolbar with a User ID and password, or some other type of authenticating mechanism (step 202), for example, some kind of biometric authentication, depending on the capabilities of the user's computer. The user may, optionally, select what type of information he would like to shared with other users. This may span the full range from remaining completely anonymous and sharing no information at all about the user's web browsing, to sharing information with only a select group of individuals, or to sharing all web browsing information with all other users. This selection can be made each time the user signs into the toolbar, or can be saved as a permanent selection to be automatically applied every time the user signs into the toolbar.

Figure 3:
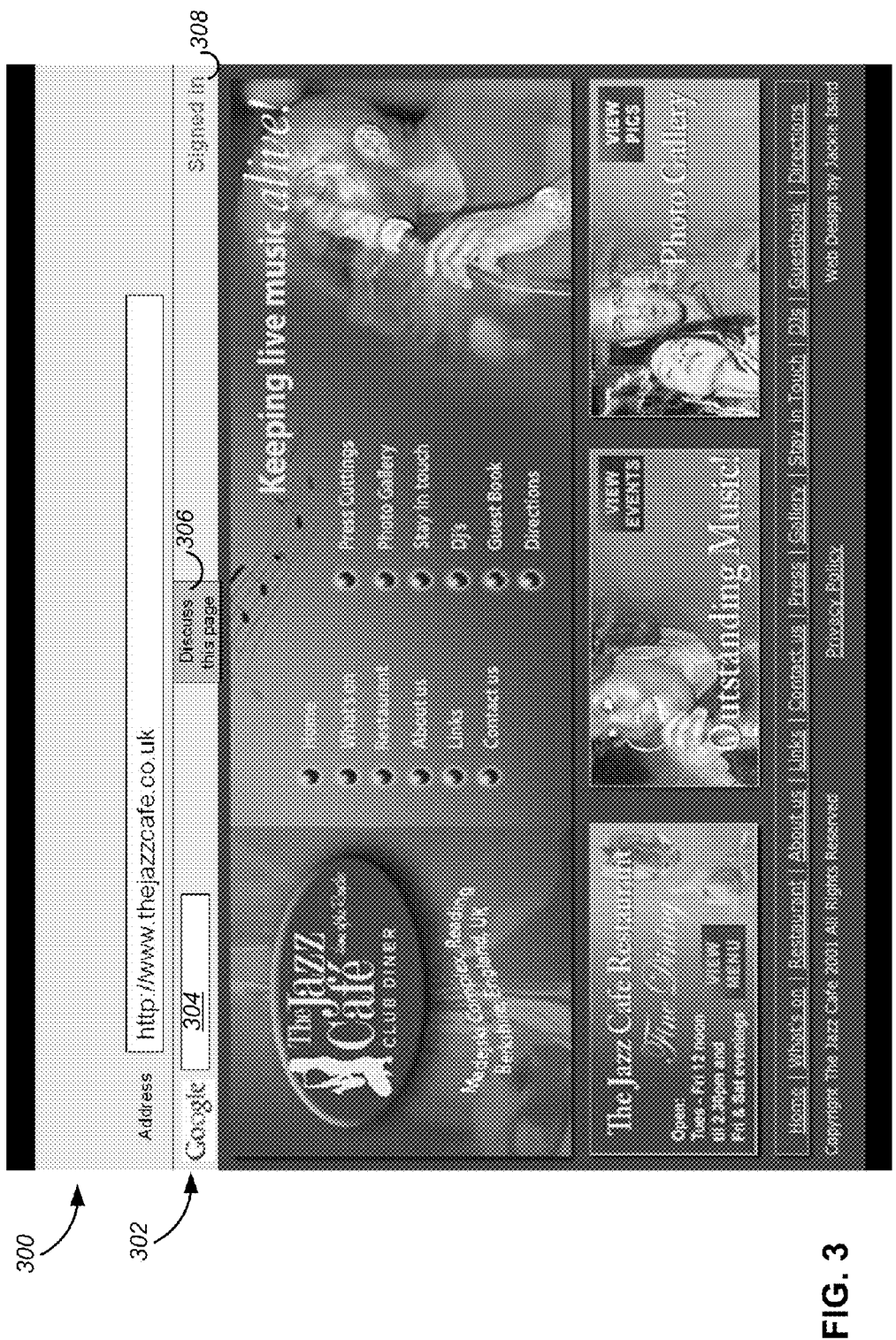
FIG. 3 shows an example of a web page being displayed in a web browser in accordance with one embodiment.

Next, the user selects a web page or web site to browse (step 204), for example, by typing in the address of the web page in the web browser's address field, or by selecting the page from a list of previously bookmarked pages in the web browser or in the toolbar. FIG. 3 shows an example of a web page (300) being displayed in a web browser. As can be seen, the toolbar (302) can contain a search box (304) for doing web searches, a button (306) that a user can click to communicate with other users about the web page (300), as will be described in further detail below, and a status indicator (308) showing that the user has signed into the toolbar (302). It should be noted that typically the toolbar (302) would contain several other functions, which for clarity reasons have been omitted from the drawings.

Upon loading the web page (300) in the browser and with the user's consent, the toolbar (302) collects information about the web page (300) (step 206) and transmits the information to the toolbar provider along with the user information (step 208). The toolbar provider, which is receiving similar information from all other users that have signed into their respective toolbars (302) and have agreed to have web browsing information collected, then checks whether there are any other users that fulfill the contact criteria outlined above and can display these other users' identities (or a subset of them) to the user (step 210). That is, the toolbar provider checks whether there are: (A) any known or unknown users who are signed into the toolbar and who are currently browsing the same web page, (B) any known or unknown users who are signed into the toolbar and who have bookmarked the same web page in the past, or (C) any known users (i.e., friends) who are signed into the toolbar, regardless of their current status or bookmarking status. In some embodiments the toolbar provider also checks the user's status, for example, "available," "idle," "busy," "unavailable," and so on, and displays only the identities of users that have a status other than "unavailable."

Figure 4:
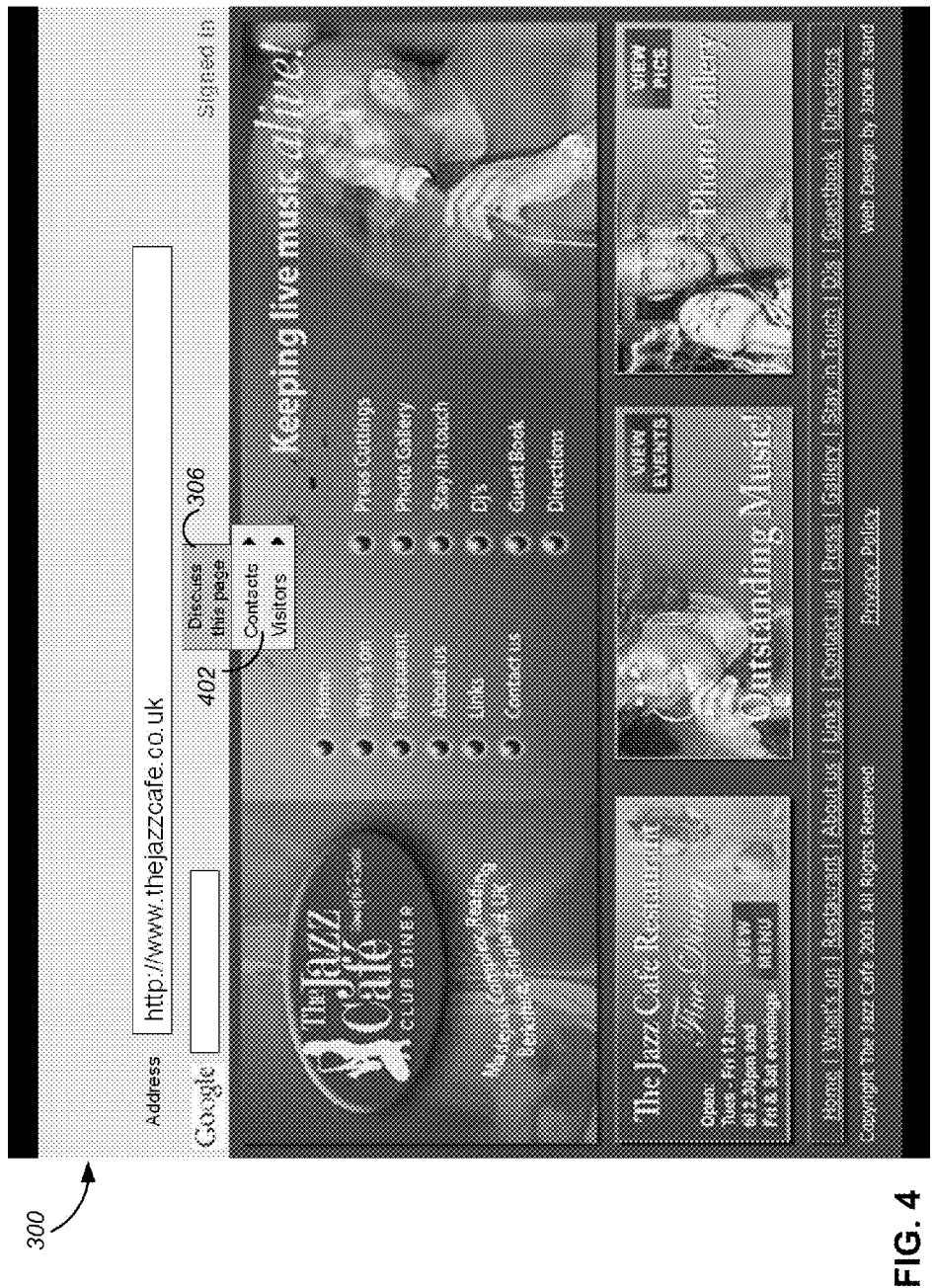
FIG. 4 shows an example of a web page and a toolbar in accordance with one embodiment.
Figure 5:
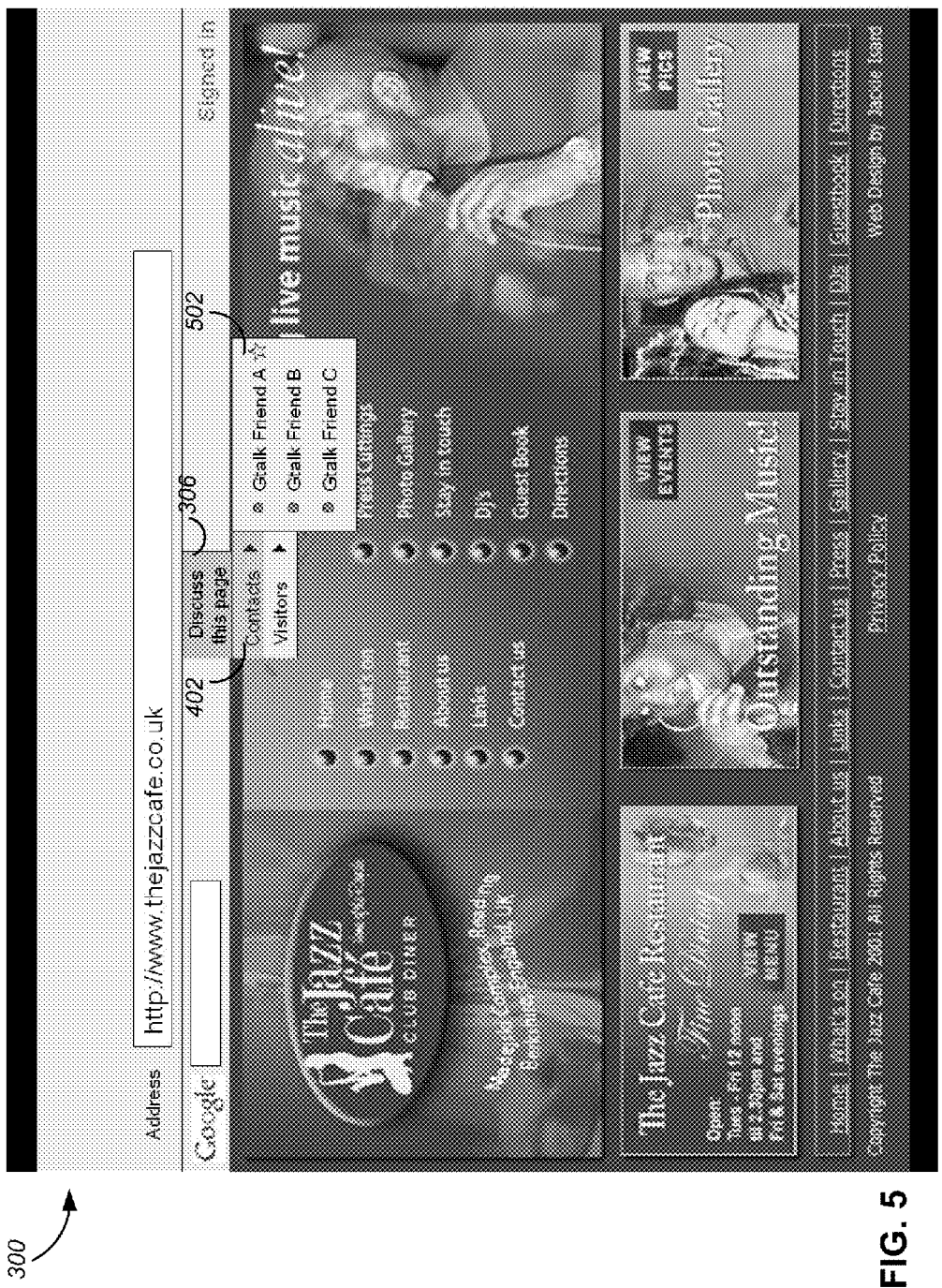
FIG. 5 shows an example of a web page and a sub-menu of a toolbar in accordance with one embodiment.
Figure 6:
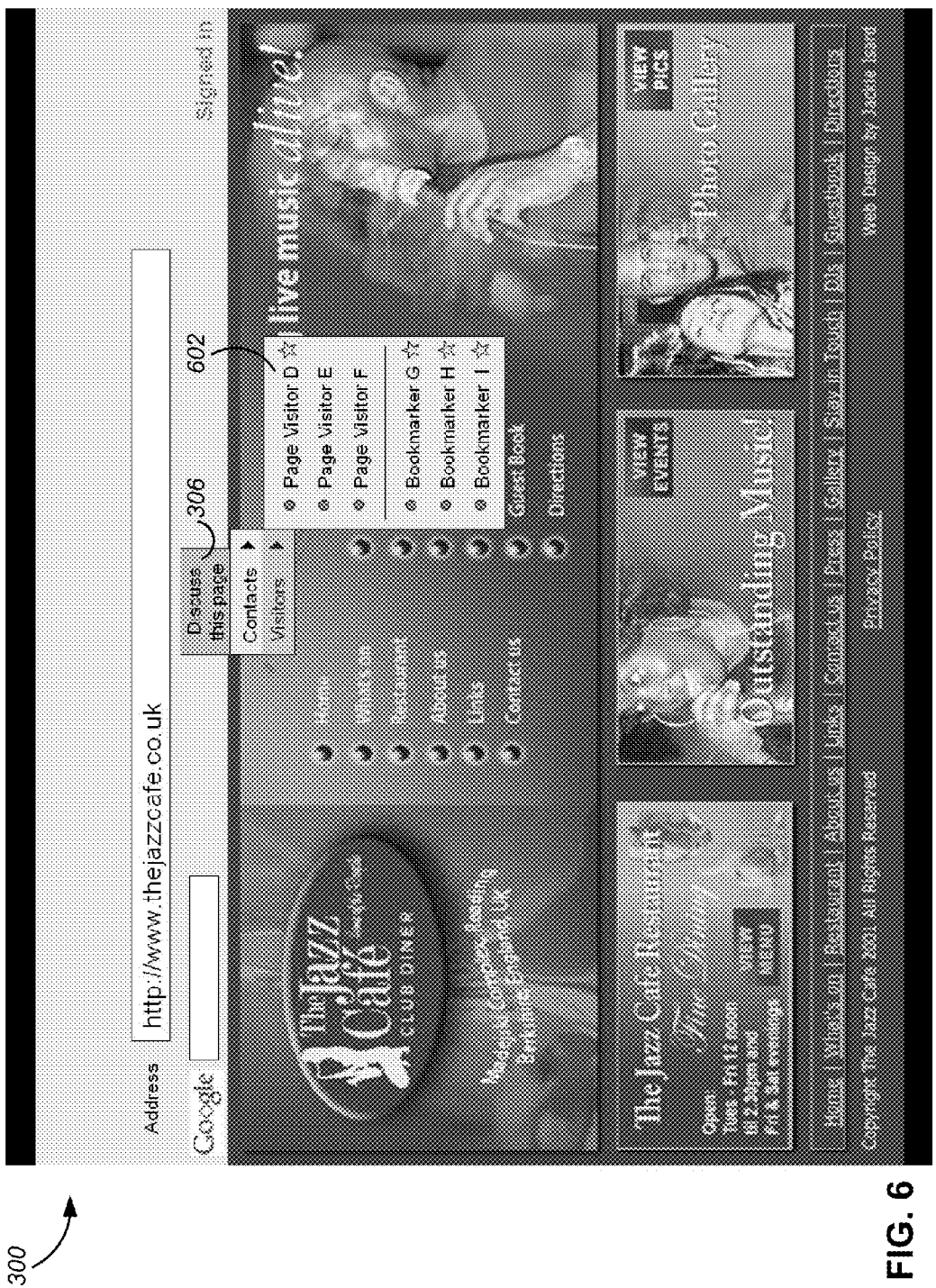
FIG. 6 shows an example of a web page and a sub-menu of a toolbar in accordance with one embodiment.

FIGS. 4-6 show how these users are displayed in accordance with one embodiment. As can be seen in FIG. 4, a drop-down menu (402) appears when the user clicks the button (306). In the embodiment shown in FIG. 4, the drop-down menu (402) is divided into "Contacts" (that is, known users), and "Visitors" (that is, unknown users). As can be seen in FIG. 5, when the user selects the "Contacts" category, a sub-menu (502) appears that lists the identified users in the respective category. The sub-menu (502) in FIG. 5 contains three known users, that is, Gtalk Friend A, Gtalk Friend B and Gtalk Friend C. As can be seen in FIG. 5, Gtalk Friend A has a star next to his identifier. The star indicates that Gtalk Friend A has bookmarked the web page. This can serve as an indicator to the user that Gtalk Friend A is more interested and/or has more knowledge about the contents of the page than Gtalk Friend B and Gtalk Friend C, respectively. In some embodiments, the order in which the known and unknown users is displayed can be based on some kind of user customizable criteria, such as bookmark status, number of visits to the web page, the frequency of contact with the user, and so on. Any combination of these and other factors can be used to organize users, as can be envisioned by those of ordinary skill in the art.

FIG. 6 shows an embodiment of when the user selects the "Visitors" category in the drop-down menu (402). As can be seen in FIG. 6, a sub-menu (602) appears which lists a group of Page Visitors, that is, other unknown users who are currently browsing the same web page, and a group of Bookmarkers, that is, other unknown users who have bookmarked the web page and who are currently signed into the toolbar but who may not be currently browsing the same web page. Similarly to FIG. 5, Page Visitor D has a star displayed adjacent to his identifier, which indicates that he has bookmarked the web page. For the same reason, all the Bookmarkers have stars displayed adjacent to their identifiers.

As can be seen in FIGS. 4-6, only three users are displayed in each category. This is due to a "user selection mechanism" that exists in some embodiments. For example, if a user browses a popular news page, such as www.cnn.com, it is very likely that there would be a large number of known and/or unknown users who are simultaneously browsing the same web page. Displaying all of these other users in the sub-menus (502; 602) could be impractical, and thus it is beneficial to perform some kind of selection of a subset of the other users to be displayed. This selection or filtering can be based on a number of factors, such as geographical proximity to the user, how many times the other users have visited the same page, how long time the other users have spent browsing the page, sub site proximity (i.e., when two users look at two different pages of the same multi-page article) and so on. Each of these criteria can serve as an indicator that the other users have more insight or knowledge about a particular page, under various circumstances. In some embodiments, the selection is done automatically by the toolbar provider; whereas in other embodiments the user can configure the selection mechanism in accordance with their own preferences, for example, so that only local users are displayed. In some embodiments, the user can also configure how many other users of each category should be displayed in the sub-menus (502; 602).

Figure 7:
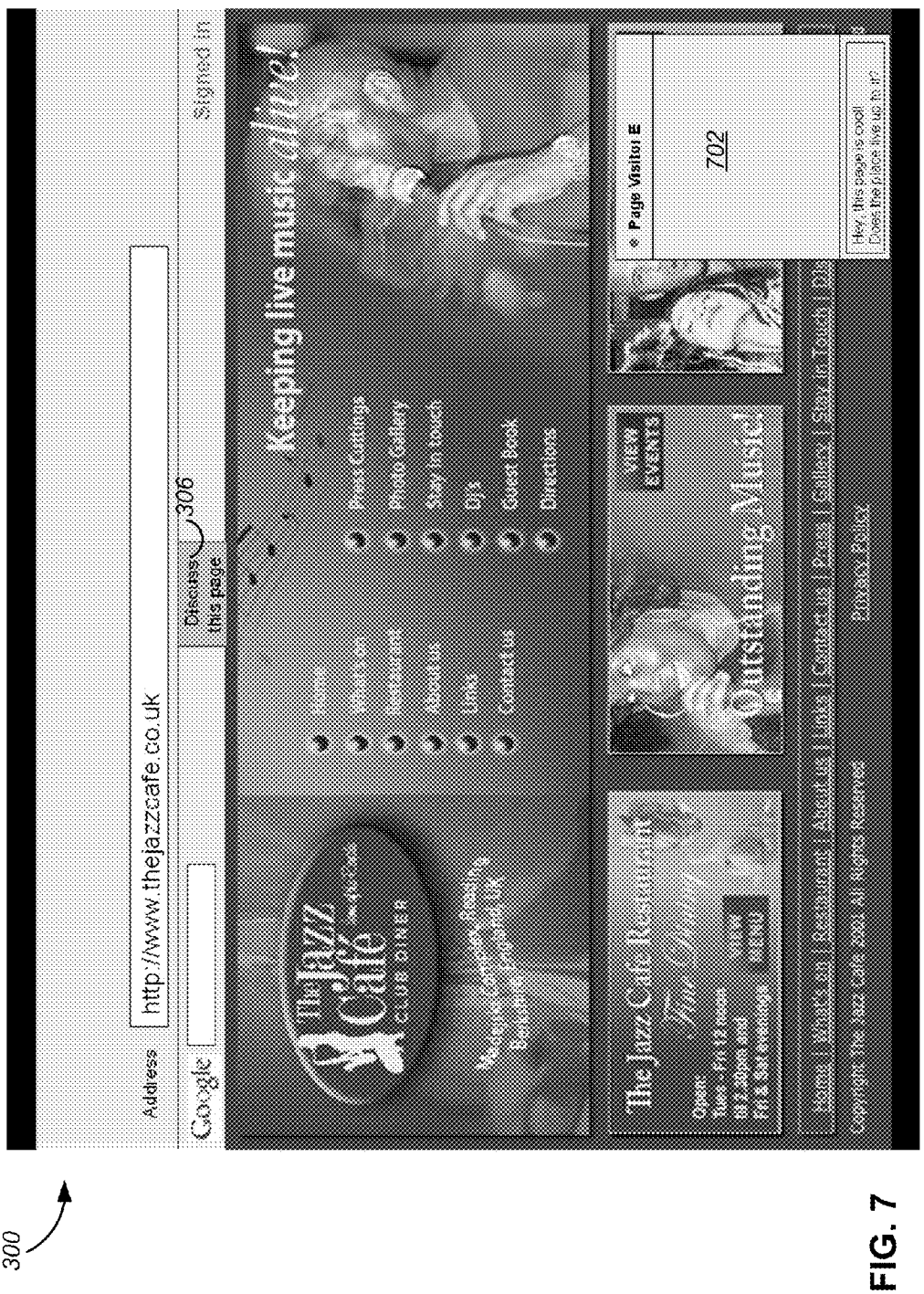
FIG. 7 shows an example of two users discussing a web page in accordance with one embodiment.

Next the user decides whether to contact another user (step 212). If the user does not wish to contact any other user to discuss the web page, the process returns to step 204, and the user continues to browse the same web page or another web page. If the user would like to contact another user, he selects one of the displayed users in the "Contacts" or "Visitors" categories that have given prior permission to be contacted (step 214), for example, by clicking on the other user's identifier in the sub-menu (502; 602). As a result, communication is established with the selected other user (step 216), which ends the process. The communication can take many shapes. For example, as can be seen in FIG. 7, an instant messaging window (702) opens up, in which the user can type and send an instant text message to the selected user. In some embodiments the instant messaging window (702) is embedded in the web browser in a specific location, whereas in other embodiments the instant messaging window (702) can be a separate window whose location can be moved to an arbitrary location on the screen by the user. The example shown in FIG. 7 shows the user contacting "Page Visitor E" and sending the message "Hey, this page is cool! Does the place live up to it?" Assuming that Page Visitor E is familiar with "The Jazz Café" featured on the web page, the user is likely to get an informative and helpful answer. Should that not be the case, the user can simply select a different user from one of the sub-menus (502; 602) and establish communication with that other user in a similar manner to what was described above, as long as other user has given permission to be contacted.

Figure 8:
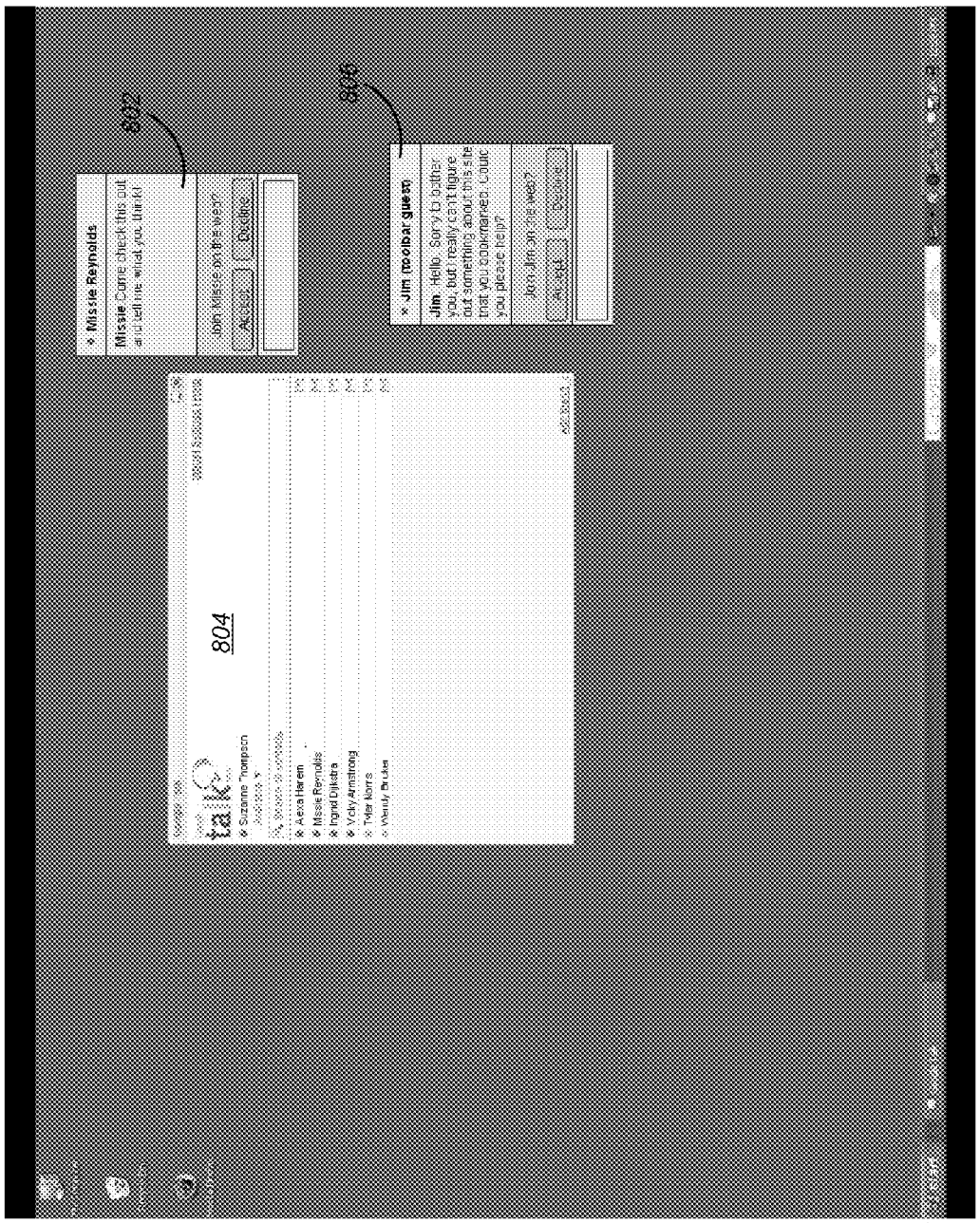
FIG. 8 shows an example of a user being contacted by another user in accordance with one embodiment.

FIG. 8 shows an exemplary screenshot (800) of what a user can see on the screen when she is being contacted by another user. As can be seen in FIG. 8, the user is contacted by two other users, and each contact results in an instant message window being displayed on the user's screen. The first user "Missy Reynolds" contact request shows up in window 802.

As can be seen in FIG. 8, "Missy Reynolds" is one of the people in the user's contact list (804), that is, a known user. In the window (802), Missy's message shows up along with an invitation to join Missy on the web. The user can choose "Accept" or "Decline" by clicking one of two different buttons, and can also type a reply message back to Missy in the lower part of the window (802). In some embodiments, clicking the "Accept" button launches a web browser displaying the same page as Missy's web browser and having an embedded instant messaging window as shown above with respect to FIG. 7, and the conversation with Missy can continue in that window.

The other message, from "Jim," is displayed in window (806). As can be seen in FIG. 8, Jim is not in the user's contact list (804), thus, he is an unknown user, which is indicated by the text "toolbar guest" in the header of the window (806). Furthermore, as can be seen in FIG. 8, the user is contacted by Jim, although the user is not currently browsing any web page. This is due to the fact that Jim is browsing a web page that the user has previously bookmarked, thus, from Jim's point of view the user is in category (B) above, that is, known or unknown users who have bookmarked the web page. In the event that the user who is being contacted is already browsing a web page, the user can be contacted directly in the browser with the same kind of browser-embedded instant messaging window that was described above with respect to FIG. 7.

In some embodiments, when a user who is contacted clicks the "Accept" button, the control of the web browser is temporarily relinquished by the user who is contacted. That is, the contacted user's browser becomes essentially a "read-only" copy of what the selecting user is looking at. Pages might scroll when the selecting user scrolls them, text fields may fill up with text entered by the selecting user, highlighted text might highlight on both users' screens, and so on, but forms submitted typically would only be submitted by the selecting user without engaging the selected user or his machine. That is, it would essentially look as if the selecting user was sharing his/her screen with the selected user.

In some embodiments, if there are no users that fulfill the contact criteria in step 210, the user can set up an "alert" function, such that she is notified when another user browses the same web page, even if the user is currently not browsing the page. In order not to get too many notifications, it is also possible for the user to set a threshold value for when a notification will occur, such as a specific time period (e.g., within the next 10 minutes), or when a particular desirability score is reached (e.g. 2 or 3).

As the skilled reader realizes, there are potential privacy issues involved with tracking what web pages various users visit and selectively distributing this information to other users. For this reason, some embodiments can incorporate a variety of mechanisms to protect the individual users' privacy. For example, as was described above, in several embodiments a user has an option of choosing whether their browsing information should be made available to other users or not. This can be done on an "all or nothing" basis, or on a more fine-grained basis, such as, the user's information is only shared when visiting specific web pages. Such fine-grained control makes it possible for users to choose what pages are acceptable to discuss or be contacted about, while avoiding topics or web pages in which the user is not interested in discussing. Yet another level of privacy can be provided by allowing users to choose how their identity will be displayed in the sub-menus (502; 602) to other users. For example, in some embodiments the users can choose to have their true name displayed, their user identifiers, or simply some kind of generic identifier, such as "User X." As a result, some users may feel more comfortable discussing certain topics while hiding their true identity behind some acronym.

Furthermore, given the varying content on the Internet, as the skilled reader realizes, the various embodiments described herein can be used for a variety of purposes, such as discussing or reviewing products, restaurants, hotels, planning travel, discussing articles, sharing parenting advice, studying foreign languages (e.g., reading a text in French and having a follow-up discussion between the teacher and the student), or collaborating on various web-based projects.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of embodiments of the invention have been described. Nevertheless, it will be understood that various modifications may be made without departing from the spirit and scope of the invention. For example, other dimensions or types of information can be tracked, such as a user's geographical location based on her IP address. This may be useful, since it is likely that a local user is more familiar with, say, a particular local store or restaurant than a user who is located several thousands of miles away and may only have visited the store or restaurant a single time. Similarly, other factors, such as educational or professional background, input voluntarily by a user, can be used as a criterion for selecting what user names to display in the toolbar. For example, it is more likely that a person with a background in computer science can provide better information or recommendations about a particular computer model or a computer store than a person with little or no knowledge of computers, who just happens to be browsing the same web page at the same time. Users can also elect to be tracked based on various demographic properties.

The various embodiments have been described in the context of a toolbar installed in a web browser. However, it should be noted that the same ideas can be implemented in a number of ways. For example, a web browser can display a frame that is dedicated for interaction with other users, as described above, and which accompanies the user across all web sites that the user visits. The communication between the users have been described with reference to instant messaging systems, but it should also be clear that there are other types of communications that would be possible. For example, many instant messaging systems allow users to communicate by voice, similar to a telephone call, if their computers are equipped with the appropriate audio devices. Such audio communications would also be feasible in accordance with the various embodiments described herein. In some embodiments, a user can decide that only known users should be displayed, as opposed to both known and unknown users. Accordingly, other embodiments are within the scope of the following claims.

The invention claimed is:

1. A computer-implemented method for initiating communication between a plurality of users, the method comprising:
   determining page information, the page information including information indicative of web content areas displayed by a first web browser and a second web browser among a plurality of web browsers, wherein the first web browser and the second web browser are associated with a first user and a second user respectively;
   determining whether the first web browser and the second web browser among the plurality of web browsers are simultaneously displaying a same web site;
   in response to determining that the first and second web browsers are simultaneously displaying the same web site:
   providing an indication to the first web browser and the second web browser that the first and second web browsers are simultaneously displaying the same web site;
   sharing identifiers of the first user and the second user and a portion of the page information of the web site displayed in the first web browser and the second web browser, wherein the identifier of the first user is provided in a menu of the second web browser associated with the second user and the identifier of the second user is provided in a menu of the first web browser associated with the first user; and
   processing a request to initiate communication between the first user and the second user using respective identifiers of the first user and the second user, wherein the communication is performed via a mechanism for the first user to send an instant message to the second user or via a mechanism for the second user to send an instant message to the first user.

2. The method of claim 1, wherein determining page information includes collecting a name of a Uniform Resource Locator for a web content area.

3. The method of claim 1, wherein the first user and the second user correspond to users using a toolbar in their respective web browsers.

4. The method of claim 1, wherein the first user and the second user have given permission to contact each other.

5. The method of claim 1, wherein the identifier of the first user is provided in a drop-down menu of a toolbar installed in the second user's web browser and the identifier of the second user is provided in a drop-down menu of a toolbar installed in the first user's web browser.

6. The method of claim 1, wherein page information includes information about what web pages the first web browser and the second web browser indicate as being bookmarked.

7. The method of claim 1, further comprising:
   providing an indication to the second web browser and first web browser when the second web browser and the first web browser are displaying the same sub-site of the web site or the same web page of the web site.

8. A non-transitory machine-readable storage device storing a computer program product for initiating communication between a plurality of users, the computer program product comprising instructions operable to cause a computer to:
   determine page information, the page information including information indicative of web content areas displayed by a first web browser and a second web browser among a plurality of web browsers, wherein the first web browser and the second web browser are associated with a first user and a second user respectively;
   determine whether the first web browser and the second web browser among the plurality of web browsers are simultaneously displaying a same web site;
   in response to determining that the first and second web browsers are simultaneously displaying the same web site:
   provide an indication to the first web browser and the second web browser that the first and second web browsers are simultaneously displaying the same web site;
   share identifiers of the first user and the second user and a portion of the page information of the web site displayed in the first web browser and the second web browser, wherein the identifier of the first user is provided in a menu of the second web browser associated with the second user and the identifier of the second user is provided in a menu of the first web browser associated with the first user; and
   process a request to initiate communication between the first user and the second user using respective identifiers of the first user and the second user, wherein the communication is performed via a mechanism for the first user to send an instant message to the second user or via a mechanism for the second user to send an instant message to the first user.

9. The non-transitory machine-readable storage device of claim 8, wherein the instructions to determine page information include instructions to collect a name of a Uniform Resource Locator for a web content area.

10. The non-transitory machine-readable storage device of claim 8, wherein the first user and the second user correspond to users using a toolbar in their respective web browsers.

11. The non-transitory machine-readable storage device of claim 8, wherein the first user and the second user have given permission to contact each other.

12. The non-transitory machine-readable storage device of claim 8, wherein the identifier of the first user is provided in a drop-down menu of a toolbar installed in the second user's web browser and the identifier of the second user is provided in a drop-down menu of a toolbar installed in the first user's web browser.

13. The non-transitory machine-readable storage device of claim 8, further comprising instructions to:
   provide an indication to the first web browser when the first web browser is displaying a web page bookmarked using the second web browser; and
   provide an indication to the second web browser when the second web browser is displaying a web page bookmarked using the first web browser.

14. The non-transitory machine-readable storage device of claim 8, further comprising instructions to:
   provide an indication to the second web browser and the first web browser when the first web browser and second web browser are displaying the same sub-site of a web site or the same web page of a web site.

15. A computer system for initiating communication among a plurality of users, the system comprising:
   a memory comprising instructions; and
   a hardware processor configured to execute the instructions to:
   determine page information, the page information including information indicative of web content areas displayed by a first web browser and a second web browser among a plurality of web browsers, wherein the first web browser and the second web browser are associated with a first user and a second user respectively;

determine whether the first web browser and the second web browser among the plurality of web browsers are simultaneously displaying a same web site in response to determining that the first and second web browsers are simultaneously displaying the same web site:

provide an indication to the first web browser and the second web browser that the first and second web browsers are simultaneously displaying the same web site;

share identifiers of the first user and the second user and a portion of the page information of the web site displayed in the first web browser and the second web browser, wherein the identifier of the first user is provided in a menu of the second web browser associated with the second user and the identifier of the second user is provided in a menu of the first web browser associated with the first user; and process a request to initiate communication between the first user and the second user using respective identifiers of the first user and the second user, wherein the communication is performed via a mechanism for the first user to send an instant message to the second user or via a mechanism for the second user to send an instant message to the first user.

16. The computer system of claim 15, wherein the first user and the second user have given permission to contact each other.

17. The computer system of claim 15, wherein the web browser application determines the page information using respective toolbars installed in the first web browser and the second web browser.

18. The computer system of claim 15, wherein the web browser application is operable to:

provide an indication to the second web browser and the first web browser when the first web browser and the second web browser are displaying the same sub-site of a web site or the same web page of a web site.

\* \* \* \* \*